United States Patent [19]

Takada

[11] 3,795,411
[45] Mar. 5, 1974

[54] MECHANISM FOR AUTOMATICALLY APPLYING SAFETY RESTRAINT BELTS

[76] Inventor: Takezo Takada, 1731 Hikotomi-cho, Hikone, Japan

[22] Filed: Mar. 15, 1972

[21] Appl. No.: 234,796

[30] Foreign Application Priority Data
Aug. 20, 1971 Japan.............................. 46-62933

[52] U.S. Cl.......................................... 280/150 SB
[51] Int. Cl............................................ B60r 21/10
[58] Field of Search.................. 280/150 SB; 180/82

[56] References Cited
UNITED STATES PATENTS
3,343,623  9/1967  Porter .......................... 280/150 SB
3,653,714  4/1972  Gentile.......................... 280/150 SB Primary Examiner—Robert R. Song
Attorney, Agent, or Firm—Wolder & Gross

[57] ABSTRACT

A mechanism for automatically applying a safety restraining belt to the occupant of a vehicle seat includes a pair of linear or curved arms movable between retracted positions with their free ends withdrawn to the sides of the seat and advanced positions with the free ends near each other above the seat cushion and forward of the seat back, and motors which are energized upon occupation of the seat and the closing of the vehicle door to advance and retract the arms. One of the arms upon advance withdraws the safety belt from a belt retraction reel and the other advanced arm engages the coupler on the belt and upon retraction draws it into locking engagement with a mating coupler at the side of the seat. Retractable belts may be located on opposite sides of the seat and the advancing arms withdraws from the belts and effects the engagement of the buckles on the belts.

15 Claims, 28 Drawing Figures

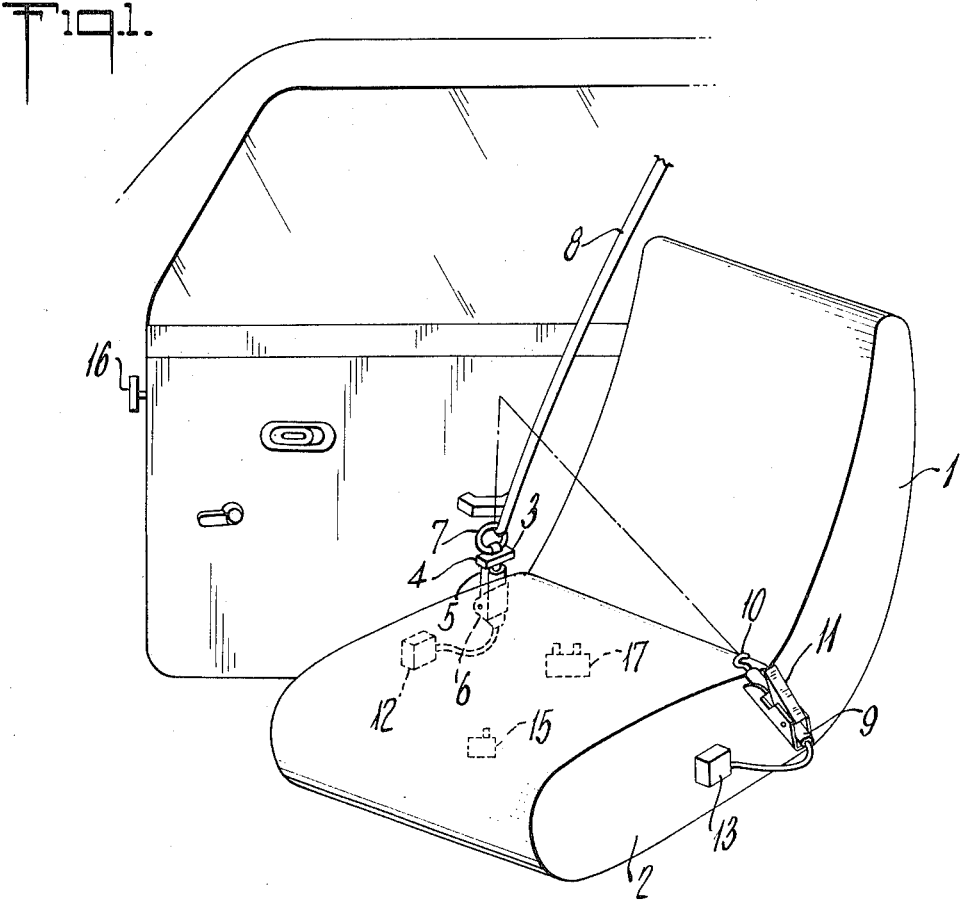
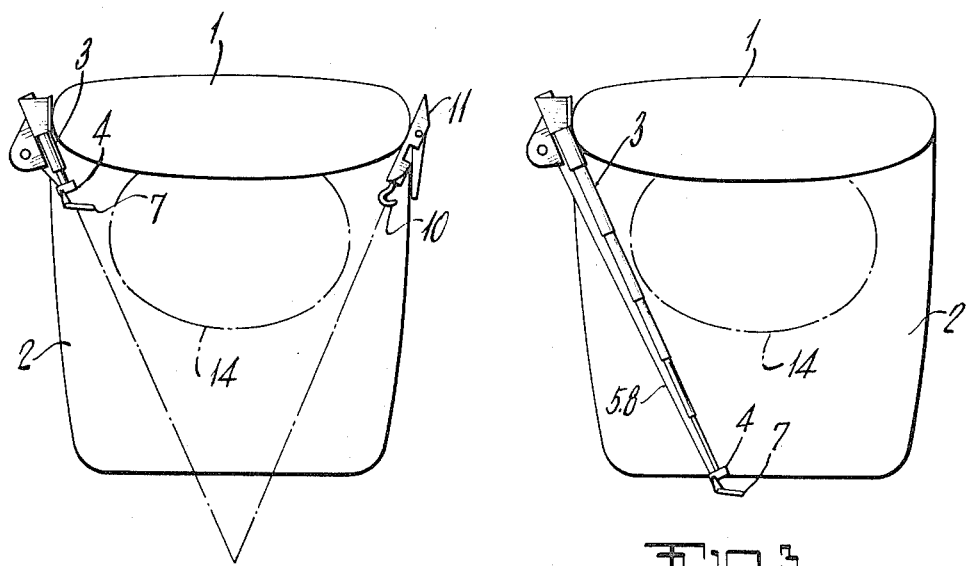

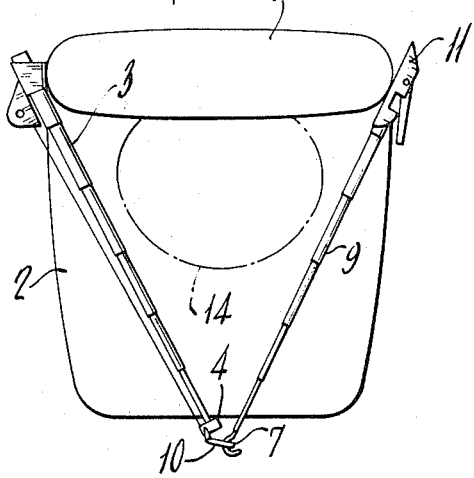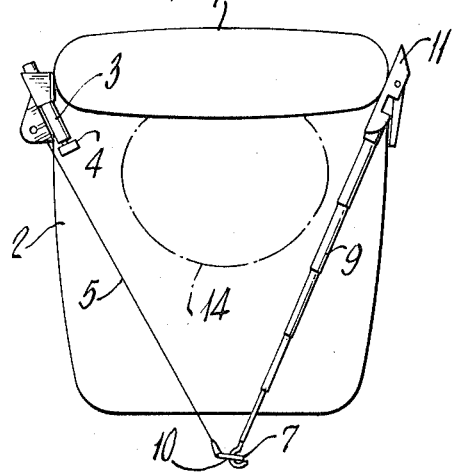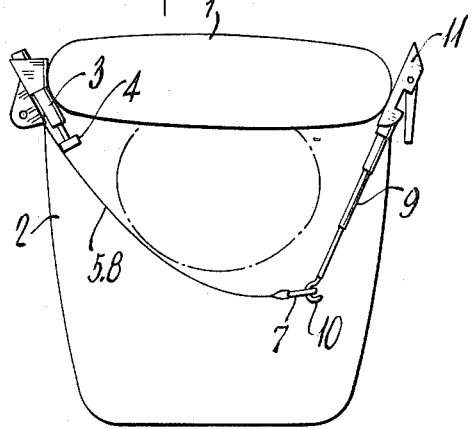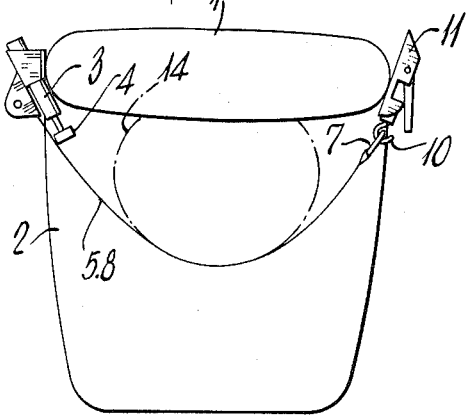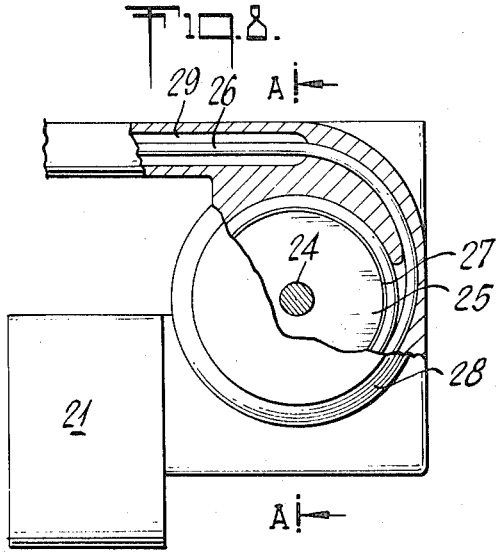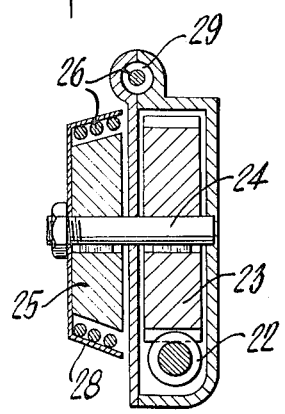

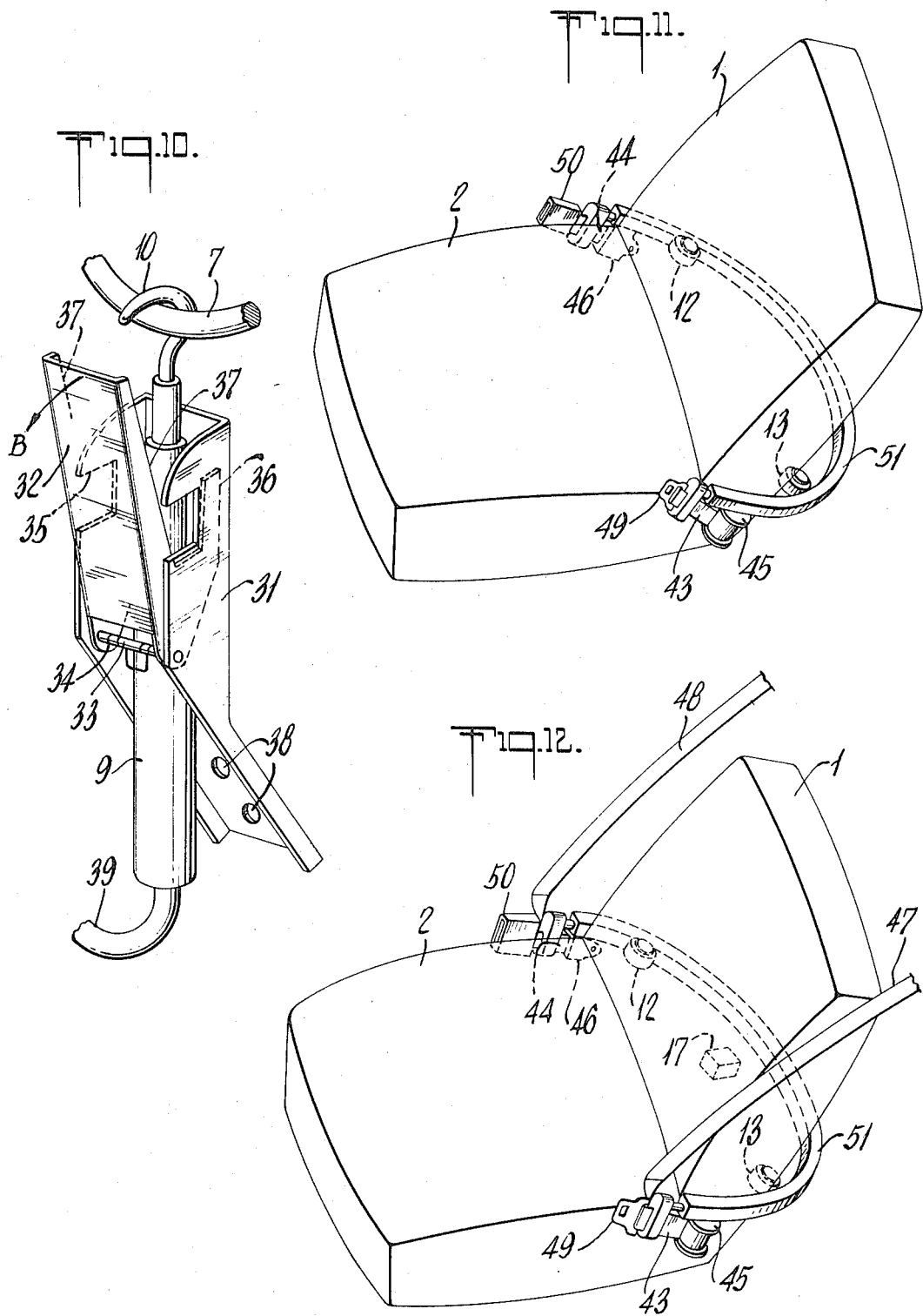

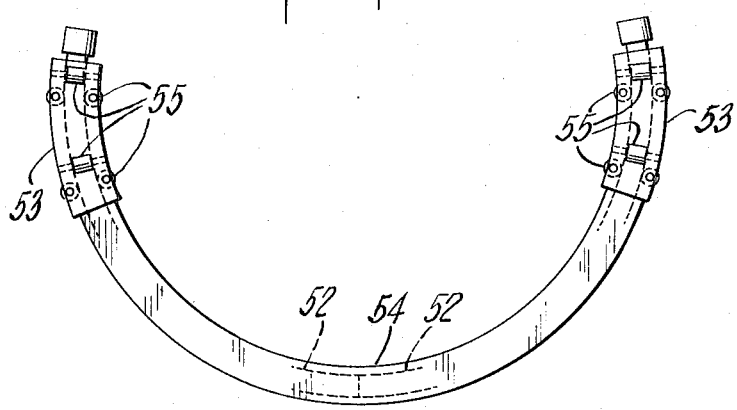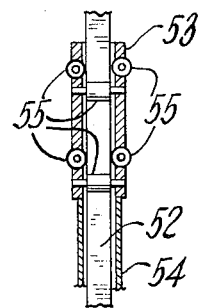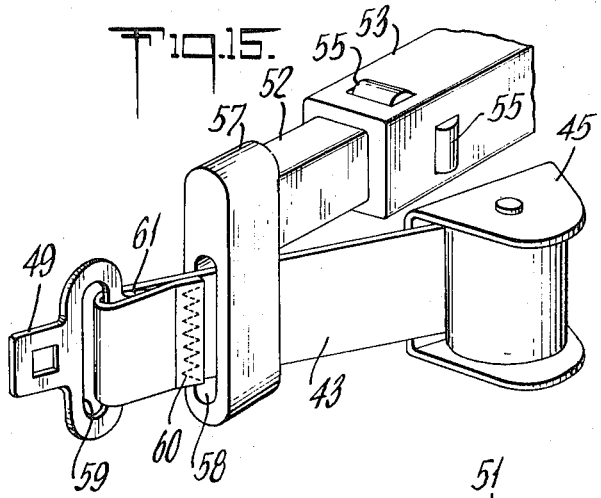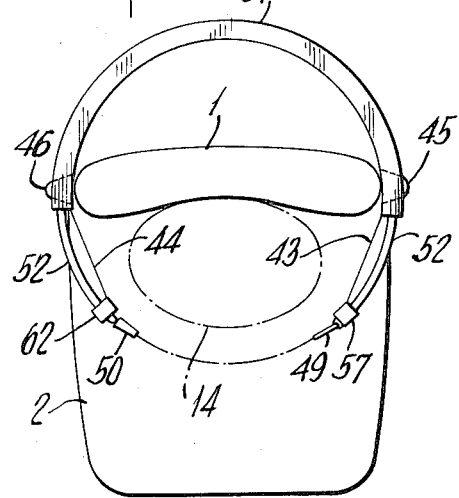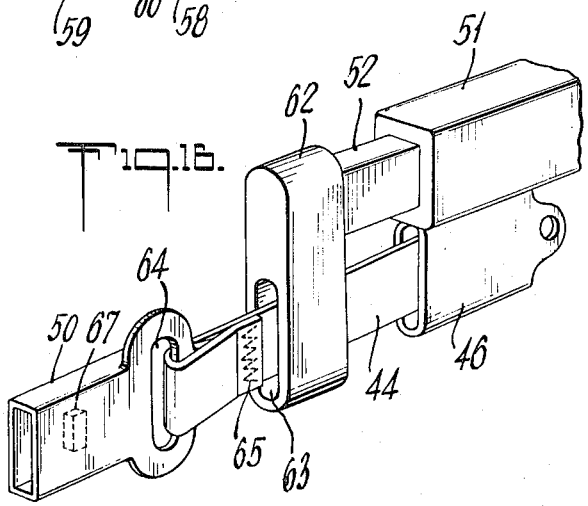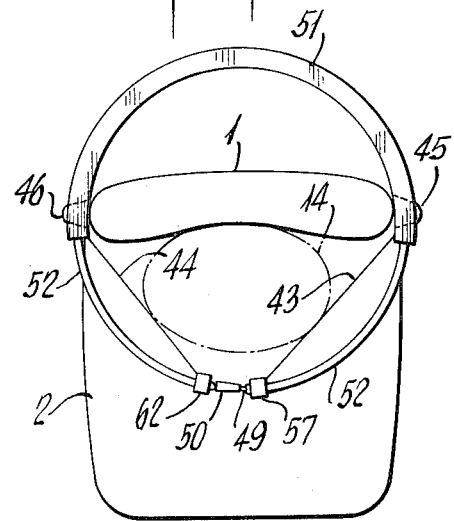

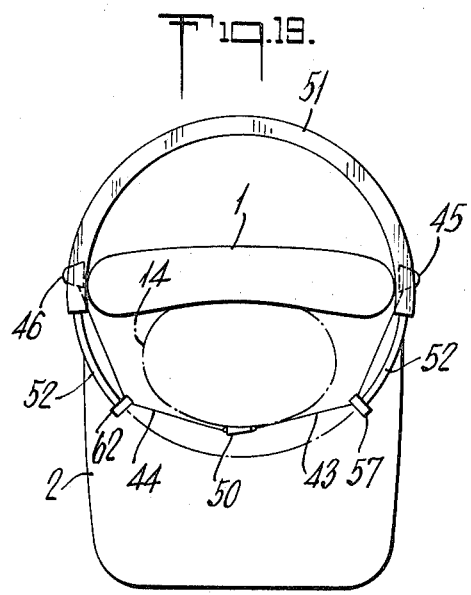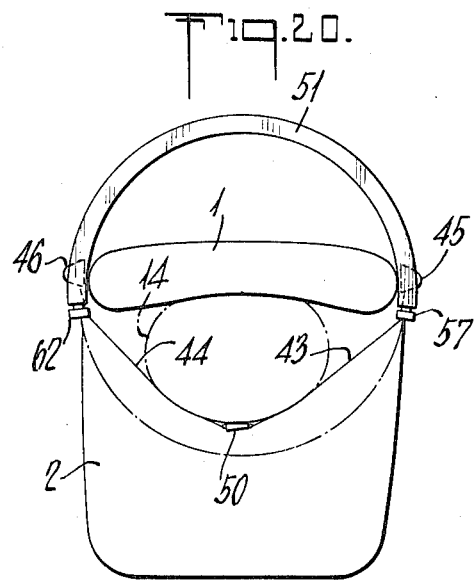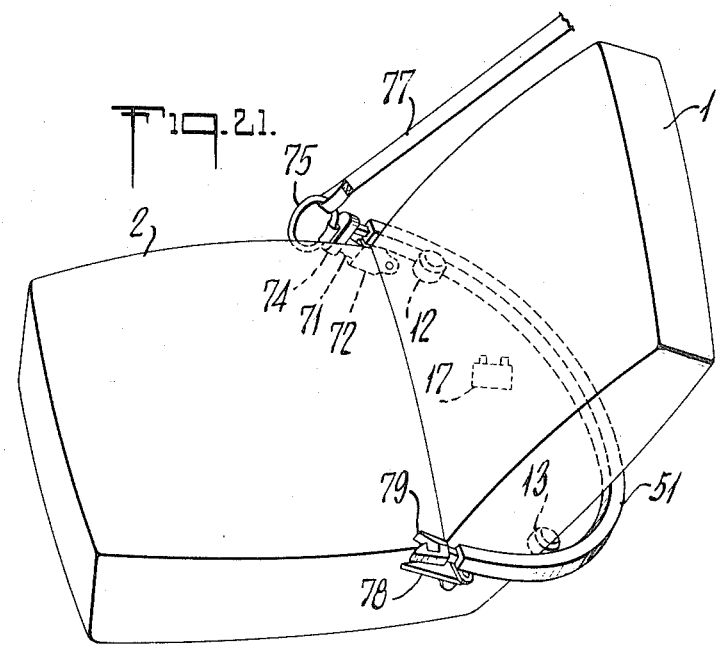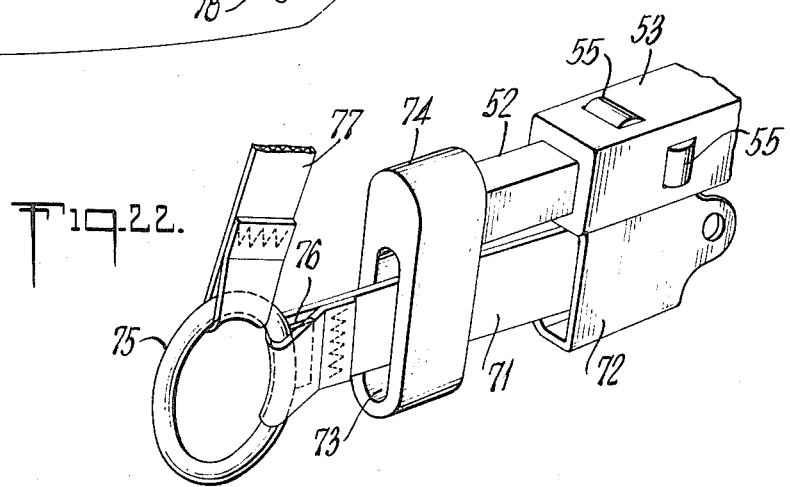

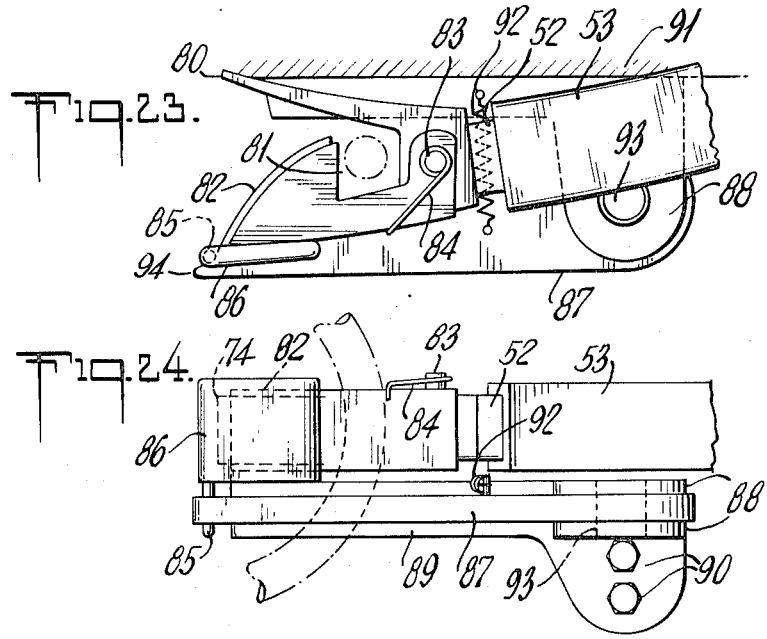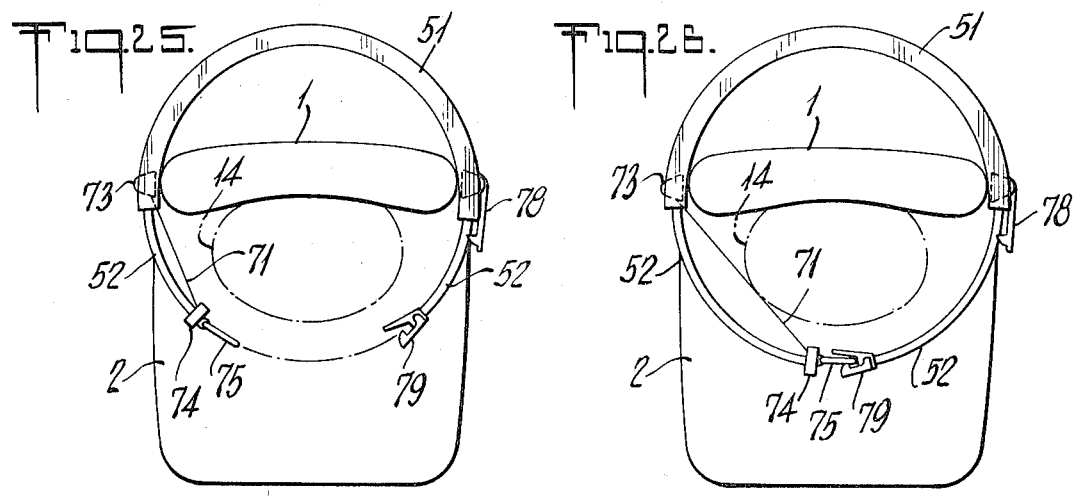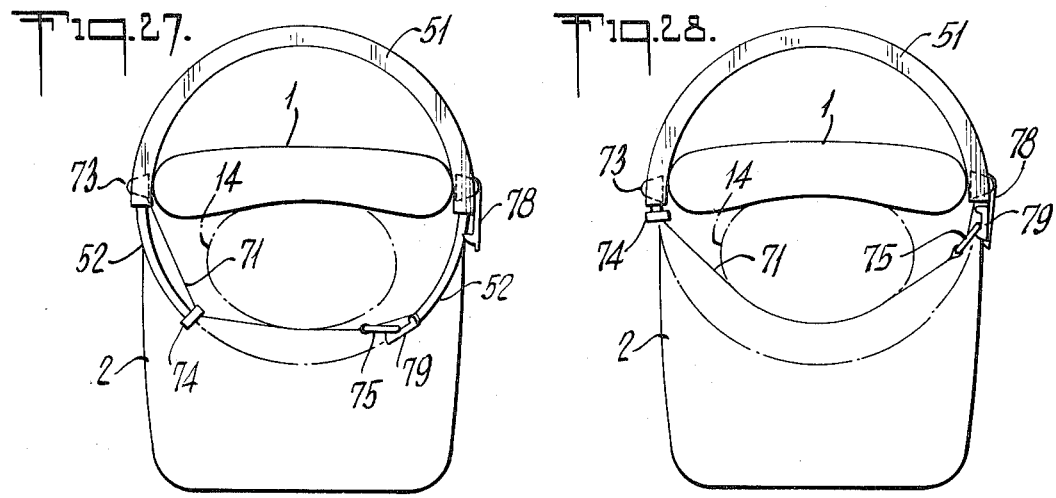

MECHANISM FOR AUTOMATICALLY APPLYING SAFETY RESTRAINT BELTS

BACKGROUND AND SUMMARY OF THE INVENTION

The present invention relates generally to mechanisms for automatically attaching a safety belt or belts to a car driver or passenger. More particularly, the present invention relates to an improved safety belt mechanism, in which, when a person occupies a seat in a vehicle and closes the vehicle door, a drive device is actuated causing retracted transfer members on both sides of the seat to extend and advance the safety belts therewith toward the center of the seat about the seat occupant until said safety belts are connected to each other, or to advance a safety belt from one side of the seat to a coupler at the other side.

The recent trend of traffic accidents shows a marked increase in deaths and injuries of the drivers or passengers riding in vehicles. There are, however, many cases where such deaths or injuries could be avoided or the seriousness of the injuries could be minimized if the drivers or passengers wore safety belts. But, many drivers or passengers are reluctant to expend the slight effort to buckle the safety belts or have a mistaken idea of safety, and this is considered responsible for many losses of lives.

In view of the above, the present invention envisages to provide a protective device which effects the automatic attachment of the safety belts without requiring any effort by the vehicle occupants, thereby to minimize the loss of life and minimize the injuries consequent to accidents.

BRIEF DESCRIPTION OF THE DRAWINGS

FIGS. 1 to 10 illustrate a preferred embodiment of the present invention in which FIG. 1 is a perspective view illustrating the improved belt applying mechanism in a retracted condition and mounted on a vehicle car seat;

FIGS. 2 to 7 are top plan views thereof illustrated in successive positions in the automatic belt applying sequence, in FIG. 2 in a belt retracted condition, FIG. 3 with a first transfer arm and the belt advanced, FIG. 4 with both transfer arms advanced and the belt ring engaged by the second arm, FIG. 5 with the first transfer arm retracted, FIG. 6 with the second transfer arm partially retracted and drawing the safety belt therewith, and FIG. 7 with the safety belt in an applied locked condition as the final step of the sequence;

FIG. 8 is a fragmentary elevational view partially in section of the transfer member advancing and retracting mechanism;

FIG. 9 is a sectional view taken along line A—A in FIG. 8;

FIG. 10 is a perspective view of the belt coupling locking mechanism;

FIGS. 11 to 20 illustrate another embodiment of the present invention as applied to a waist belt applying system in which FIG. 11 is a perspective view thereof;

FIG. 12 is a view similar to FIG. 10 in which the improved mechanism is shown as applied to a four point belt applying system;

FIG. 13 is a plan view of the belt applying mechanism;

FIG. 14 is a side elevational view of the transfer arm guide assembly;

FIG. 15 is a fragmentary perspective view of the left hand belt and the associated transfer arm section;

FIG. 16 is a view similar to FIG. 15 of the right hand belt and the associated transfer arm section;

FIGS. 17 to 20 are plan views showing the sequential positions of the belts and transfer arms in an automatic belt applying cycle;

FIGS. 21 to 28 illustrate another embodiment of the present invention in which FIG. 21 is a perspective view of the improved mechanism as applied to a three point seat belt;

FIG. 22 is a fragmentary perspective view of the right hand end of the mechanism proximate the retractable seat belt;

FIG. 23 is a plan view of the coupling ring engaging hook portion and locking portion;

FIG. 24 is a side elevational view thereof as seen from the left side of the seat; and FIGS. 25 to 28 are plan views illustrating sequential positions of the mechanism in a belt applying cycle.

DESCRIPTION OF THE PREFERRED EMBODIMENTS

Referring now to the drawings and particularly FIGS. 1 to 10 thereof, which illustrate one embodiment of the present invention, reference numeral 3 generally designates a telescopic or expandable transfer member or stretcher 3 which is secured in a contracted condition on the right side of a seat, near the juncture between the seat back 1 and the seat cushion 2, and a hanger 4 is secured at the fore end of the stretcher 3. At about the same position as the stretcher 3 there is also mounted a take-up means 6 in the form of a spring rewound reel for a waist belt 5. An end of the waist belt 5 extends through a slot in the hanger 4 and is fastened to a coupling ring 7. Also secured to ring 7 is an end of a shoulder belt 8 whose other end is fixed to a side of the vehicle body. On the left side of the seat, a stretcher 9 having a hook 10 at its end is housed within an uniform locking means 11. There are also provided on both sides of the seat driving means 12 and 13 adapted to extend and contract stretchers 3 and 9, respectively. Each of the driving means 12, 13 comprises a motor 21 which has its shaft directly connected to a worm gear 22 which, in turn, engages a worm wheel 23 to provide a speed reducing transmission. The shaft 24 of worm wheel 23 is secured to and rotates a conical winding drum 25. An elongated flexible fine core piece 26 made of plastic or like material is wound on drum 25, with an end of the former being fastened to the latter. The end of the plastic core piece 26, after having been wound on the drum, extends through a slot 29 and is connected to respective stretchers 3, 9. Each driving means is protected by a cover 28.

The locking means 11 includes a U-shaped unlocking lever 32 which is pivotally secured by a pin 33 to a lock frame 31 having U-shaped recesses 35. Unlocking lever 32 is normally pressed against the lock frame 31 by a coil spring 34. The lock frame 31 is secured at its bottom portion 38 to a seat frame, and the stretcher 9 is positioned within the lock frame 31. There is also provided a pipe 39 for connecting the driving plastic core 26 to motor 21.

Considering now the operation of the mechanism described above, when a person sits on the seat and closes the vehicle door, a seat switch 15 and a door switch 16 are actuated to actuate the driving means 12, 13 through a suitable control box 17. Namely, as shown in FIGS. 8 and 9, motor 21 is rotated forwardly to transmit its rotation through worm 22 and worm wheel 23 to winding drum 25 rotating it in a manner to push out the plastic core 26. As the plastic core 26 is pushed out, the stretchers 3 and 9 connected thereto are accordingly urged to extend outwardly. FIG. 3 shows the condition where the stretcher 3 has been extended to its maximum length and the hanger 4 at the end thereof has pulled out the waist belt 5 and shoulder belt 8 forwardly to the center of the seat, and FIG. 4 shows the condition where the stretcher 9 has also extended out to the center position, with the hook 10 at the end thereof passing through the stationary ring 7 at the end of the stretcher 3 as shown. When the stretchers 3, 9 have extended out to their maximum lengths, respectively, they are retracted or contracted under the controlling operation of control box 17. That is, motor 21 is rotated reversely to cause a backward rotation of the drum 25 to wind up the plastic core 26, thereby contracting the stretchers 3, 9. FIG. 5 shows a situation where the stretcher 3 on the right side has been contracted, with its hanger 4 holding the waist belt 5 remote from ring 7, while the stretcher 9 on the left side remains stationary. It is to be noted that, during this operation, the ring 7 is retained by the hook 10 of the stretcher 9 while being pulled by tension of the waist belt 5 whose end is secured to ring 7. Then, when the stretcher 9 is contracted, the hook 10 pulls the ring 7 toward the locking section 11 as shown in FIG. 6, whereby both waist belt 5 and shoulder belt 8 encircle the person 14 in a manner shown in FIG. 7.

The locking section 11 operates as follows. As the hook 10 at the end of the stretcher 9 returns while engaging the ring 7 with the contraction of the stretcher 9 as shown in FIG. 10, ring 7 is forced downwardly by the hook 10 until it bears on the outer edges 37 of the U-shaped unlocking lever 32, urging the latter to turn in the direction of arrow B, so that the ring is further urged downwardly until it finally engages the U-shaped recesses 35 and is locked therein.

When it is desired to release the safety belts from the person 14, the unlocking lever 32 is turned in the direction of arrow B, whereby the inner edges 36 of the lever push the ring 7 from the recesses 35 to release it from the locking means, thus allowing the safety belts to e retracted to their original positions by the action of the take-up means of waist belt 5 and shoulder belt 8.

In another embodiment of the present invention as shown in FIGS. 11 to 20, spring wound reels or other take-up means 45, 46 for waist belts 43, 44 are provided on both sides of the vehicle seat, adjacent the juncture between the seat back 1 and the seat cushion 2, and a semi-circular automatic belt applying structure 51 extends about the lower rear portion of the seat back 1 so as to bridge the upper parts of the take-up means 45, 46. At the left side end of the structure 51, there is provided a coupling buckle tongue plate 49 to which waist belt 43 and a shoulder belt 47 are secured. Provided at the right side end of said structure 51 is a buckle 50 to which waist belt 44 and a shoulder belt 48 are fastened. Take-up means for the shoulder belts 47, 48 are provided in the car body above the seat back or within the seat. The automatic belt applying structure 51 includes a pair of quarter-circular transfer arms 52, guide members 53, case 54, rollers 55 and rubber rollers 56. The substantially quarter-circular arms 52, square-shaped in section, are housed within the case 54 of similar circular configuration and having rollers mounted adjacent the end exits thereof. These rollers comprise three horizontal rollers 55 and one vertical rubber roller 56 on each side. All of these rollers are secured to the respective guide members 53 adapted to support the arms 52. The rollers 55 are arranged to minimize the frictional resistance of arms 52 by reason of the rolling contact to effect a smooth operation. The rubber roller 56 is pressed against the interior surface of the arm 52 and is driven by a motor. These roller assemblies are provided symmetrically on both sides of the structure 51.

A hanger 57 is secured at the left end of the left side arm 52 and is formed with a slot 58 of a size that will allow the passage of about three thicknesses of waist belt 43. The end of the waist belt 43 passes through slot 58 and turns back upon passing through the slot 59 in the tongue plate 49 and is stitched to the belt 43 as at 60. The tongue plate 49 is also provided with a tail portion 61 rearwardly of the slot 59. Since the waist belt 43 is constantly pulled rearwardly by the tensile force of the take-up means 45, the tail portion 61 normally registers with slot 58 of the hanger 57, thus allowing the tongue plate 49 to always assume a fixed angle relative to the arm 52.

On the right end of the right side arm 52 is mounted a hanger 62 which is provided at its lower part with a slot 63 of a size that will allow passage of about three thicknesses of waist belt 44 at one time. The end of the waist belt 44 passes through slot 63 and turns back upon passing a slot 64 formed in the buckle 50 and is sewn to the belt 44 as at 65. The buckle 50 is also provided with a tail portion 66 rearwardly of the slot 64. Normally, since the belt 44 is pulled rearwardly by the tensile force of the take-up means 46, tail portion 66 is retained in the slot 63 in the hanger 62, thus keeping the buckle 50 always at a fixed angle relative to the arm 52. In the buckle 50, there is also provided a lock confirmation or sensing switch 67, and when the tongue plate 49 is fitted with the buckle 50 and locked, the driving motor is rotated reversely. The arrangements of seat switch 15, door switch 16 and control box 17 are similar to those used in the first embodiment. The differences from the first embodiment are that driving means 12, 13 are mounted adjacent the automatic belt applying structure and that said driving means are connected to the respective guide members 53.

In the operation of the mechanism last described, when a person sits on the seat and closes the door, seat switch 15 and door switch 16 of the arrangement shown in FIG. 1 are turned on to actuate control box 17 as seen in FIG. 12 to start the operation of driving means 12, 13. In response to the forward rotation of the driving motors, rubber rollers 56 disposed in contact with respective guide members 53 are actuated to push out or extend the respective arms 52. As arms 52 are thus extended, tongue plate 49 and buckle 50 are engaged by hangers 57 and 62, respectively, at the ends of respective arms 52 as shown in FIGS. 15 and 16, and consequently, waist belts 43 and 44 are withdrawn. As a result, as shown in FIG. 17, tongue plate 49 and mating buckle 50 are coupled and locked in front of the occupant 14 as shown in FIG. 18. As the tongue plate 49 and buckle 50 are locked, lock confirmation switch 67 is actuated to reverse the rotation of the drive motors. Reversal of motor rotation causes rubber rollers 56 to rotate backwardly to retract arms 52 into case 54, causing hangers 57, 62 to return therewith. Since waist belts 43, 44 remain locked, they remain in a position extending about the front of the occupant, as shown in FIG. 20. The above explanation as applied to the operation of waist belts 43, 44 is similarly applicable to the automatic application of the shoulder belts 47, 48 as shown in FIG. 12. Accordingly, the automatic application of the four-point type safety belt is achieved.

The invention is now described in relation to its third embodiment illustrated in FIGS. 21 to 28 which is similar to the foregoing second embodiment in the arrangements of the driving means transfer arms, case and electrical means. It should be noted that the mechanisms of the present invention can be as well embodied in the form of a three-point safety belt as in the form of a simple waist safety belt as shown in FIG. 11 and a four-point safety belt with the additional use of two shoulder belts as shown in FIG. 12 which were described in connection with the second embodiment.

A take-up means 72 for a waist belt 71 is provided on the right side of the seat, adjacent the juncture between the seat back 1 and seat cushion 2. Extending round the lower rear portion of the seat is a half-circular automatic belt applying structure 51 which is similar to that used in the second embodiment. At the forward end of one arm 52 is secured a hanger 74 formed with a slot 73 of a size allowing passage of about three thicknesses of waist belt 71 at one time. The end of the waist belt 71 extends from a take-up means 72, passes through slot 73, extends through and back around a coupling ring 75 and is sewn to belt 71 as shown. Ring 75 is provided with a tail portion 76. Normally, waist belt 71 is pulled back under the tensile force of take-up means 72, so that the tail portion 76 engages slot 73 in hanger 74, orientating ring 75 at a fixed angle relative to hanger 74. An end of a shoulder belt 77 extending from a take-up means provided at a side of vehicle body is also secured to ring 75.

On the left side of the seat there is provided a locking or coupling means 78 which is secured to the seat cushion. This locking means 78 functions, in cooperation with a ring engaging or hook portion 79 secured to the end of a respective arm 52, to guide waist belt 71 and shoulder belt 77 from the right side to the left side of the seat and intercouple and lock them. The mechanism of hook portion 79, includes a V-shaped metal element 80 secured to the end of arm 52 housed within guide member 53, and a plate 82 having U-shaped recesses 81 is pivotally secured to element 80 by a pin 83 in a manner that they overlap each other. Plate 82 is urged in a clockwise direction by a coil spring 84. Secured to the top of plate 82 is a handle 86 provided with a protuberance 85 at the bottom thereof. It is not absolutely necessary that hook portion 79 have sufficient strength to bear the tension of the safety belt produced when the belt is subjected to an impact force.

The locking means 78 comprises a lock frame 87 formed with U-shaped recess 81 and a base plate 89 provided with flanges 88 adapted to hold lock frame 87 from both sides thereof. Base plate 89 is fastened to a seat cushion frame by means of bolts 90 and lock frame 87 is normally urged in a clockwise direction about pin 93 by spring 92. At the end of lock frame 87, there is provided a projection 94 arranged in superposed relation with protuberance 85 of handle 86. Locking means 78 is required to have sufficient strength to bear the tension of the safety belt produced when the latter is subjected to an impact force.

Considering now the operation of the automatic guiding and protecting device of the embodiment last described, FIG. 21 shows in a retracted condition, the present device for automatically applying a three-point type safety belt, FIG. 22 shows that portion of the mechanism near the waist belt wind-up means, and FIGS. 23 and 24 are a plan view and a side view, respectively, of the locking means 78 and hook portion 79.

When a person 14 sits on the seat and closes the door, seat switch 15 and door switch 16 such as shown in FIG. 1 are actuated to energize control box 17 to start the operation of driving means 12 and 13 shown in FIG. 21. As driving means 12, 13 are thus operated, arms 52 shown in FIGS. 22 to 24 are advanced to bring waist belt 71 toward the center of the seat by means of hanger 74. In the meantime, hook portion 79 is also advanced toward the seat center (see FIG. 25). Upon arrival of hanger 74 and hook portion 79 at the center position, in front of the rider 14, as shown in FIG. 26, plate 82 is spread out by ring 75 and primary locking is completed by engagement of the ring into U-shaped recesses 81. Upon completion of this primary locking, the motors for the driving means 12, 13 are so controlled by control box 17 as to reverse their direction of rotation. As motor rotation is reversed, arms 52 are now retracted as shown in FIG. 27, so hanger 74 and hook portion 79 are also retracted to bring waist belt 71 toward locking means 78. When waist belt 71 arrives at locking means 78, lock frame 87 is swung counterclockwise by the retracting force of arm 52, allowing the ring 75 to fit into recess 81 in lock frame 87 to thereby accomplish the final locking in a manner shown in FIG. 28.

When the rider desires to unlock the locked belts, he has only to turn the handle 86 as viewed in FIG. 23, counterclockwise, whereby the protuberance 85 on the handle acts to urge projection 94 of lock frame 87 to also turn counterclockwise, thereby allowing the ring 75 to be released from locking means 78 as the former is pulled by pull-in force of wind-up means 72.

The mechanisms of the present invention are rugged, reliable, compact and convenient, and automatically positively apply a restraining safety belt to the occupant of a vehicle seat merely upon occupation of the seat and the closing of the vehicle door. No extra action on the part of the seat occupant is required so that the hazzards of driving without a seat belt are obviated.

While there have been described and illustrated preferred embodiments of the present invention, it is apparent that numerous alteration omissions and additions may be made, without departing from the spirit thereof.

What is claimed is:

1. A safety belt mechanism in a vehicle including a seat having opposite first and second sides, a frist belt moveable from a point at said first side of said seat between an extended and retracted position and normally urged toward a retracted position, a first coupling member mounted on said belt proximate its free end, a second coupling member adapted to releaseably engage said first coupling member and connected to a point at said second side of said seat, transfer means for advancing said coupling members into engagement including a first transfer member having an outer and end moveable from a retracted position proximate said first seat side along a path toward said second seat side to an advanced position, first belt advancing means located on said transfer member for extending said belt toward said seat second side with the movement of said transfer member toward said second side and motivating means for advancing and retracting said transfer member, said belt having a shoulder located proximate the free end thereof and said belt advancing means comprising a body member retractably moveable independently of said belt and having a front face bearing on said shoulder with the advance of said transfer member to thereby advance said belt.

2. The mechanism of claim 1 wherein said second coupling member is anchored to a point proximate said seat second side.

3. The mechanism of claim 1 including a second belt connecting said second coupling member to a point proximate said seat second side.

4. The mechanism of claim 1 wherein said transfer member includes a plurality of telescoping elements slideable between an extended advanced position upwardly inclined toward said seat second side and a contracted telescoped position, said advancing and retracting means extending and contracting said telescoping elements.

5. The mechanism of claim 1 wherein said transfer member comprises an arm longitudinally movable along the length thereof from retracted position rearwardly of said seat with the forward end of said arm proximate said seat first side along a path forwardly of the rear of said seat and toward said seat second side.

6. The mechanism of claim 5 wherein said arm is arcuate with the forward end thereof traversing an arcuate path with the advance and retraction of said arm.

7. The mechanism of claim 1 including a second belt movable from a point at said second side of said seat between an extended and retracted position and normally urged toward a retracted position, said second coupling member being mounted on the free end of said second belt, a second transfer member, said first and second transfer members extending from said first and second sides of said seat respectively, means mounted on said second transfer member for extending said second belt with the advance of said second transfer member for carrying said coupling members into mutual engagement with the advance of said transfer members.

8. The mechanism of claim 1 including means responsive to the occupation of said seat for actuating said motivating means.

9. The mechanism of claim 1 wherein said vehicle is provided with a door and including means responsive to the closing of said door for actuating said motivating means.

10. The mechanism of claim 1 including a first switch actuated in response to the presence of an occupant in said seat and a second switch actuated in response to the closing of a door of said vehicle, said motivating means being responsive to the concurrent actuation of said first and second switches.

11. A safety belt mechanism in a vehicle including a seat having opposite first and second sides, first belt moveable from a point at said first side of said seat between an extended and retracted position and normally urged toward a retracted position, a first coupling member mounted on said belt proximate its free end, a second coupling member adapted to releaseably engage said first coupling member and connected to a point at said second side of said seat, and transfer means for advancing said coupling members into engagement including a first transfer member having an outer end moveable from a retracted position proximate said first seat side along a path toward said second seat side to an advanced position, first belt advancing means located on said transfer member for extending said belt toward said seat second side with the movement of said transfer member toward said second side, motivating means for advancing and retracting said transfer member, a second transfer member, said first and second transfer members extending from said first and second sides of said seat respectively said transfer members being moveable to advanced positions with their respective outer ends approaching each other and to retracted positions with said outer ends proximate said first and second sides of said seat, and said second coupling member including second belt advancing means on said second transfer member for engaging the outer end of said belt and drawing said belt with the retraction of said second transfer member toward said second seat side.

12. The mechanism of claim 11 wherein said second coupling member is anchored proximate said seat second side.

13. The mechanism of claim 12 wherein said first coupling member comprises a coupling ring and said second belt advancing means comprises a hook element mounted on the free end of said second transfer member and movable into engagement with said coupling ring with the advance of said transfer members.

14. The mechanism of claim 12 wherein each of said transfer members comprises an arcuate arm movable between advanced positions with the leading ends forwardly and inwardly of the rear sides of said seat and retracted positions with said arm leading ends being positioned proximate the rear side portions of said seat.

15. The mechanism of claim 12 wherein each of said transfer members includes a plurality of telescoping elements slideable between extended advanced positions, with the leading ends thereof approaching each other and retracted positions with said leading ends being positioned proximate the sides of said seat.

* * * * *